(12) United States Patent
Sankaradas et al.

(10) Patent No.: US 12,050,664 B2
(45) Date of Patent: Jul. 30, 2024

(54) REAL-TIME CROSS-SPECTRAL OBJECT ASSOCIATION AND DEPTH ESTIMATION

(71) Applicant: NEC Laboratories America, Inc., Princeton, NJ (US)

(72) Inventors: Murugan Sankaradas, Dayton, NJ (US); Kunal Rao, Monroe, NJ (US); Yi Yang, Princeton, NJ (US); Biplob Debnath, Princeton, NJ (US); Utsav Drolia, Milipitas, CA (US); Srimat Chakradhar, Manalapan, NJ (US); Amit Redkar, Princeton, NJ (US); Ravi Kailasam Rajendran, Princeton, NJ (US)

(73) Assignee: NEC Corporation, Tokyo (JP)

( * ) Notice: Subject to any disclaimer, the term of this patent is extended or adjusted under 35 U.S.C. 154(b) by 485 days.

(21) Appl. No.: 17/494,979

(22) Filed: Oct. 6, 2021

(65) Prior Publication Data
US 2022/0114380 A1    Apr. 14, 2022

Related U.S. Application Data

(60) Provisional application No. 63/089,703, filed on Oct. 9, 2020.

(51) Int. Cl.
*G06F 18/25* (2023.01)
*G06F 18/214* (2023.01)
(Continued)

(52) U.S. Cl.
CPC ........ *G06F 18/253* (2023.01); *G06F 18/2148* (2023.01); *G06N 3/045* (2023.01);
(Continued)

(58) Field of Classification Search
CPC ... G06F 18/253; G06F 18/2148; G06N 3/045; G06N 3/047; G06N 3/084; G06T 7/50;
(Continued)

(56) References Cited

U.S. PATENT DOCUMENTS

| | | |
|---|---|---|
| 6,882,959 B2 | 4/2005 | Rui et al. |
| 9,389,681 B2 | 7/2016 | Sankar et al. |

(Continued)

OTHER PUBLICATIONS

He Zhang et al., 'Synthesis of High-Quality Visible Faces from Polarimetric Thermal Faces using Generative Adversarial Networks', arXiv: 1812.05155v1, Dec. 2018 [retrieved on Jan. 13, 2022]. Retrieved from <https://arxiv.org/abs/1812.05155v1> pp. 2, 8.

(Continued)

*Primary Examiner* — Christopher M Brandt
(74) *Attorney, Agent, or Firm* — Joseph Kolodka

(57) ABSTRACT

A method for real-time cross-spectral object association and depth estimation is presented. The method includes synthesizing, by a cross-spectral generative adversarial network (CS-GAN), visual images from different data streams obtained from a plurality of different types of sensors, applying a feature-preserving loss function resulting in real-time pairing of corresponding cross-spectral objects, and applying dual bottleneck residual layers with skip connections to accelerate real-time inference and to accelerate convergence during model training.

20 Claims, 10 Drawing Sheets

(51) Int. Cl.
*G06N 3/045* (2023.01)
*G06T 7/50* (2017.01)
*G06T 11/00* (2006.01)
*G06V 10/40* (2022.01)
*G06V 20/00* (2022.01)

(52) U.S. Cl.
CPC ............... *G06T 7/50* (2017.01); *G06T 11/00* (2013.01); *G06V 10/40* (2022.01); *G06V 20/00* (2022.01); *G06T 2207/20081* (2013.01); *G06T 2207/20084* (2013.01); *G06T 2207/20221* (2013.01); *G06T 2210/12* (2013.01)

(58) Field of Classification Search
CPC .......... G06T 11/00; G06T 2207/20081; G06T 2207/20084; G06T 2207/20221; G06T 2210/12; G06T 2207/10024; G06T 2207/10028; G06T 2207/20076; G06T 2207/30196; G06T 2207/30201; G06T 2207/30232; G06T 2207/30252; G06T 7/521; G06T 7/55; G06T 7/593; G06V 10/40; G06V 20/00; G06V 10/82
See application file for complete search history.

(56) References Cited

U.S. PATENT DOCUMENTS

| | | |
|---|---|---|
| 9,639,748 B2 | 5/2017 | Porikli et al. |
| 10,671,068 B1 | 6/2020 | Xu et al. |
| 10,762,440 B1 | 9/2020 | Garg et al. |
| 2018/0217585 A1 | 8/2018 | Giering et al. |
| 2020/0027442 A1* | 1/2020 | Mathur ................. G06N 3/08 |

OTHER PUBLICATIONS

Chaitanya Devaguptapu et al., 'Borrow from Anywhere: Pseudo Multi-modal Object Detection in Thermal Imagery', arXiv: 1905.08789v2, Jul. 2020 [retrieved on Jan. 13, 2022] https://arxiv.org/abs/1905.08789v2> p. 4, and figure 2.

Arun CS Kumar et al., 'Monocular Depth Prediction using Generative Adversarial Networks', In: 2018 IEEE/CVF Conference on Computer Vision and Pattern Recognition Workshops (CVPRW), Jun. 22, 2018, p. 413.

* cited by examiner

REAL-TIME CROSS-SPECTRAL OBJECT ASSOCIATION AND DEPTH ESTIMATION

RELATED APPLICATION INFORMATION

This application claims priority to Provisional Application No. 63/089,703, filed on Oct. 9, 2020, the contents of which are incorporated herein by reference in their entirety.

BACKGROUND

Technical Field

The present invention relates to cross-spectral transformation and matching and, more particularly, to real-time cross-spectral object association and depth estimation.

Description of the Related Art

Fusing the data captured with multiple sensor modalities to localize, detect and perceive depth of objects is a difficult task due to the unavoidable physical displacement of sensors, and the vastly different semantic information in different types of sensor streams.

SUMMARY

A method for real-time cross-spectral object association and depth estimation is presented. The method includes synthesizing, by a cross-spectral generative adversarial network (CS-GAN), visual images from different data streams obtained from a plurality of different types of sensors, applying a feature-preserving loss function resulting in real-time pairing of corresponding cross-spectral objects, and applying dual bottleneck residual layers with skip connections to accelerate real-time inference and to accelerate convergence during model training.

A non-transitory computer-readable storage medium comprising a computer-readable program for real-time cross-spectral object association and depth estimation is presented. The computer-readable program when executed on a computer causes the computer to perform the steps of synthesizing, by a cross-spectral generative adversarial network (CS-GAN), visual images from different data streams obtained from a plurality of different types of sensors, applying a feature-preserving loss function resulting in real-time pairing of corresponding cross-spectral objects, and applying dual bottleneck residual layers with skip connections to accelerate real-time inference and to accelerate convergence during model training.

A system for real-time cross-spectral object association and depth estimation is presented. The system includes a memory and one or more processors in communication with the memory configured to synthesize, by a cross-spectral generative adversarial network (CS-GAN), visual images from different data streams obtained from a plurality of different types of sensors, apply a feature-preserving loss function resulting in real-time pairing of corresponding cross-spectral objects, and apply dual bottleneck residual layers with skip connections to accelerate real-time inference and to accelerate convergence during model training.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
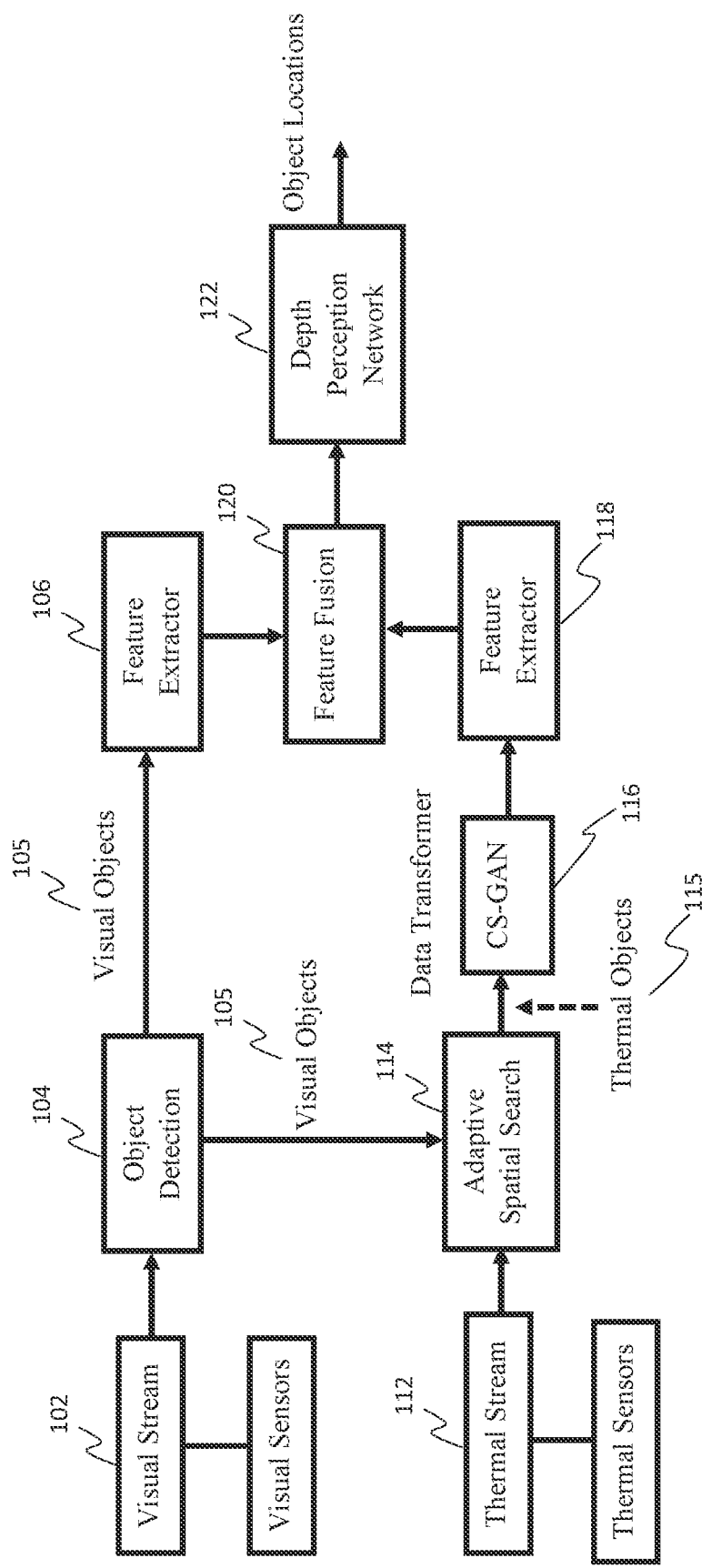
FIG. 1 is a block/flow diagram of an exemplary object localization architecture, in accordance with embodiments of the present invention.

Many emerging applications combine data streams from a variety of sensors to leverage the complementary strengths of different sensing modalities while canceling out their weaknesses, leading to improved sensing capabilities. Such sensor fusion produces rich, context-aware data that eliminates the limitations in information, range, and accuracy of any individual sensor. As an example, autonomous cars are considered. A challenge is to adequately understand the car's 3D environment in real-time under affordable sensor cost and embedded computing constraints. Cameras placed on every side of the car attempt to recognize objects and stitch together a 360-degree view of the environment. Radars supplement camera vision in times of low visibility like night driving and provide data on the speed and location of objects. LiDARs measure distances and perceive depth of objects even in lowlight conditions, which neither cameras nor radars can do. So, rather than rely on just one type of sensor, autonomous cars combine data from a variety of sensors to achieve real-time vision, autonomy, reliability and redundancy. Other applications that make simultaneous use of visual camera and depth sensors include human pose estimation, action recognition, simultaneous localization and mapping, and people tracking. Visual and thermal sensors are increasingly being used together to improve accuracy and speed of a variety of new video surveillance systems and face-recognition based applications such as biometric payment systems, authentication and unmanned access control systems, and fever screening solutions to infer person attributes such as liveliness or elevated body temperature.

The ability to localize, detect and perceive depth of objects in an observed 3D scene is a key precondition in many applications like automatic manufacturing, inspection and quality assurance, and human-robot interaction. However, single modality sensing systems have limitations that are inherently difficult to overcome, and they are inadequate for many emerging sensing applications. For example, single-camera perception systems cannot provide reliable 3D-geometry, and their average accuracy is 60% less than a LiDAR-based system. Multiple-camera systems (stereo cameras) can provide accurate 3D geometry, but they do so at a high computational cost and they perform poorly in high-occlusion and texture-less environments, or in poor lighting conditions. LiDARs provide high-precision 3D geometry, independent of ambient light, but they are limited by their high cost, poor performance in severe weather conditions like heavy rain, fog and snow, and inability to recognize or classify objects as well as visual cameras. To mitigate the limitations of single modality sensing systems, cross-spectral fusion such as sensor fusion of data streams from visual cameras and LiDARs, fusion of visual and thermal data streams and fusion of LiDAR and thermal streams is an emerging research theme.

A common issue when fusing the data captured with multiple sensor modalities is to find the corresponding regions in the data streams. This is a non-trivial task. First, due to the physical displacement of the sensors, their fields of view are not aligned. Second, the semantic information contained in the sensor streams, and the data format, are very different. Visual (RGB) cameras project the real-world into a dense, regular, ordered and discrete 2D array of pixel intensities, an image that includes rich visual information to recognize or classify objects. In contrast, the data from a depth sensor such as LiDAR preserves the 3D geometry and structure information in a point cloud that is sparse, irregular, order-less and preserves the continuous values of physical distances. In contrast to a visual camera and a depth sensor, thermal cameras detect radiation emitted, transmitted and reflected by an object, which increases with temperature. Thermal data allows a person to see variations in temperatures and compute discriminative temperature signatures. Third, 3D scene object localization, detection, recognition and depth perception by using multiple sensor modalities is further complicated by the need to deliver real-time performance under application-specific affordable cost and resource constraints.

In view thereof, the exemplary methods introduce a cross-spectral object association and depth estimation technique for real-time applications. Although the exemplary methods illustrate the concepts using visual and thermal data streams, the proposed techniques are applicable to other combinations of sensor types and sensing modalities. The advantages include at least:

Employing a CS-GAN, which is a cross-spectral deep-learning generative adversarial network that synthesizes visual spectrum object images from thermal data. CS-GAN ensures that the synthesized images are visually homogeneous and have the key, representative object level features necessary to uniquely associate with objects detected in the visual spectrum. This appears to be the first technique that enables real-time feature-level association of objects in visual and thermal streams.

CS-GAN further includes a feature-preserving loss function that results in high-quality pairing of corresponding regions in real-time, which has been difficult to accomplish with computation intensive pixel-level approaches. Network enhancements are also introduced that leverage dual bottleneck residual layers with skip connections to accelerate real-time inference and speed up convergence during model training. A multivariable linear regression model to estimate location by leveraging the object's feature level correspondence from CS-GAN is also provided. This avoids the need to take into account the geometric calibration of visual and thermal cameras, which is usually necessary to account for the intrinsic (optical center and focal length) and extrinsic (location of cameras) parameters between the visual RGB and thermal cameras.

A real-time system for finding corresponding objects in full high-definition (HD) visual and non-visual data streams is further introduced. By using the object's feature-level correspondence, the exemplary methods avoid the more compute-intensive pixel-level cross-spectral stereoscopy.

FIG. 1 illustrates the proposed object localization approach.

A visual stream 102 is provided to the object detector 104. A thermal stream 112 is provided to the adaptive spatial searcher 114. The visual objects 105 determined or extracted by the object detector 104 from the visual stream 102 are also provided to the adaptive spatial searcher 114, as well as to the feature extractor 106. The thermal objects 115 extracted from the thermal stream 112 are provided to the CS-GAN 116, where the data is transformed and provided to a feature extractor 118. The data from the feature extractors 106, 118 are fused or combined by the feature fuser 120 to generate a depth perception network 122 to determine object locations.

The input thermal stream data can be from a variety of electromagnetic spectrums like ultraviolet (UV), near infrared or far infra-red. Although the exemplary methods consider only visual and thermal data streams, the exemplary approach can be used with other spectral modalities such as depth streams (point clouds). In FIG. 1, the input visual stream 102 is the target domain. The exemplary methods use object detectors 104 in the target domain to detect objects like a face, person, or vehicle. Using the bounding boxes from object detector 104, the exemplary methods perform an adaptive spatial search 114 in the thermal spectrum, which is also the source domain, to form several candidate bounding box proposals. This avoids the need for good object detectors in the thermal domain where accurate object detection is a known issue due to the texture-less nature of such data.

Due to sensor displacement, corresponding objects in the cross-spectral image pair are not aligned. Spatial displacement, and orientation, of corresponding cross-spectral object images are a function of both distance and offset relative to the axes of the two sensors. Since the exemplary methods only have good feature extractors for the target domain (visual) readily available, the exemplary methods first transform images from the source domain (thermal) to the target domain (visual) by using a generative adversarial network CS-GAN 116, which is a modified version of CycleGAN.

CycleGAN models are often used to generate realistic looking images for applications like color conversion, object transfiguration and style transfer. CycleGAN processes an input image of size 256×256, and the time taken to synthesize rich textured target images (from which the exemplary methods can extract object level features in the target domain) is several 100's of milliseconds per object image tile. This processing rate is not suitable for real-time applications. To perform the object detection and feature extraction in real-time, the exemplary methods show that a 64×64 image size is enough to design an accurate inference pipeline. However, reducing the image size to lower resolutions like 64×64 does not improve the CycleGAN inference time significantly. Moreover, the generated visual images are not of good quality, and they are unsuitable for feature extraction in the source domain. In a real-time video processing scenario (25 fps), a frame has to be processed in under 40 ms. To achieve this goal, the exemplary methods propose a new deep-learning network CS-GAN 116, which uses bottleneck cascaded residual layers along with custom perceptual loss and feature loss functions (in addition to the adversarial and cyclical losses). These modifications enable the exemplary methods to improve inference time to under 40 ms, and the generated images are sharper and of good, acceptable quality.

Figure 2:
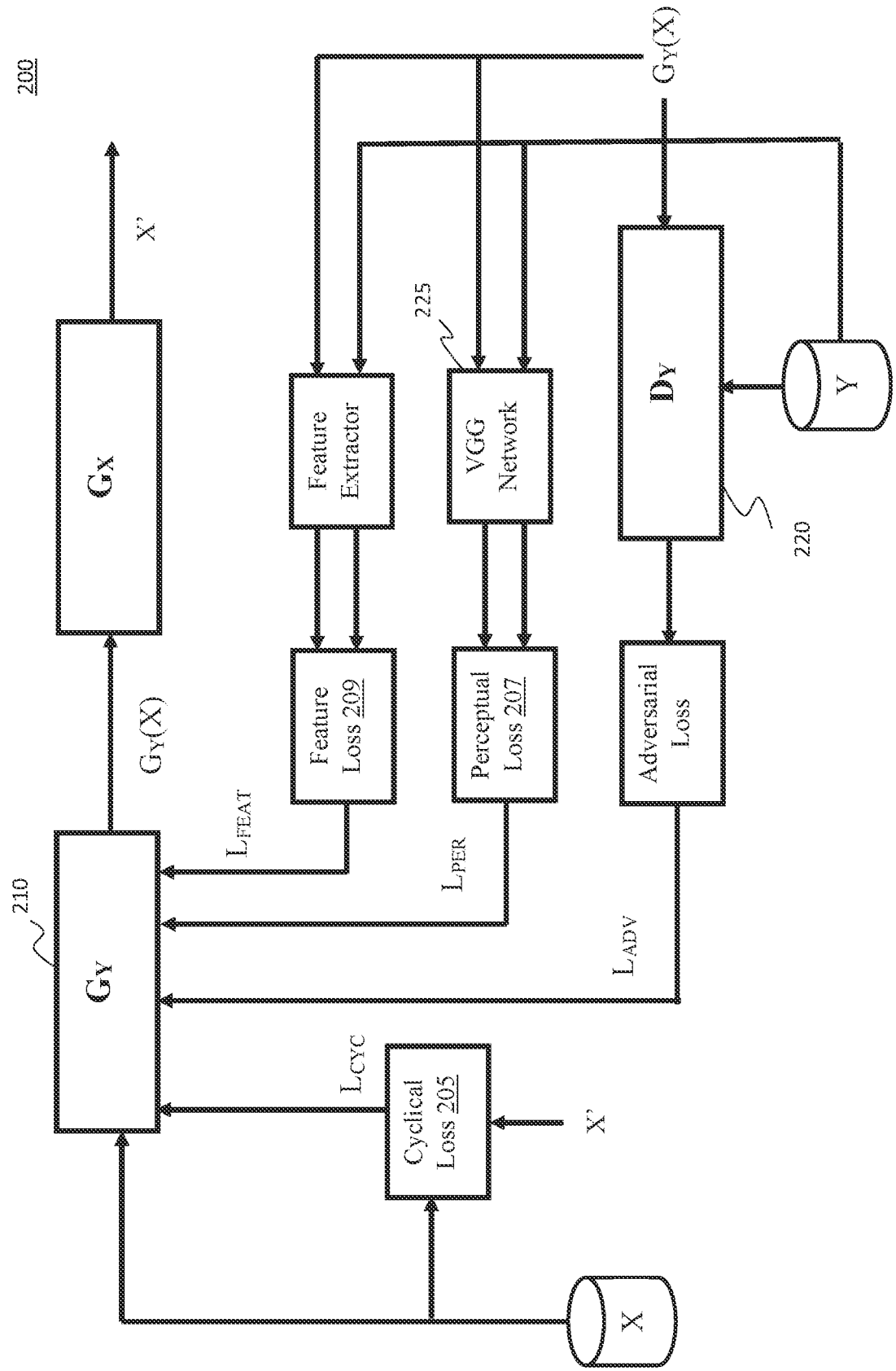
FIG. 2 is a block/flow diagram of an exemplary thermal-to-visual synthesis architecture, in accordance with embodiments of the present invention.
Figure 3:
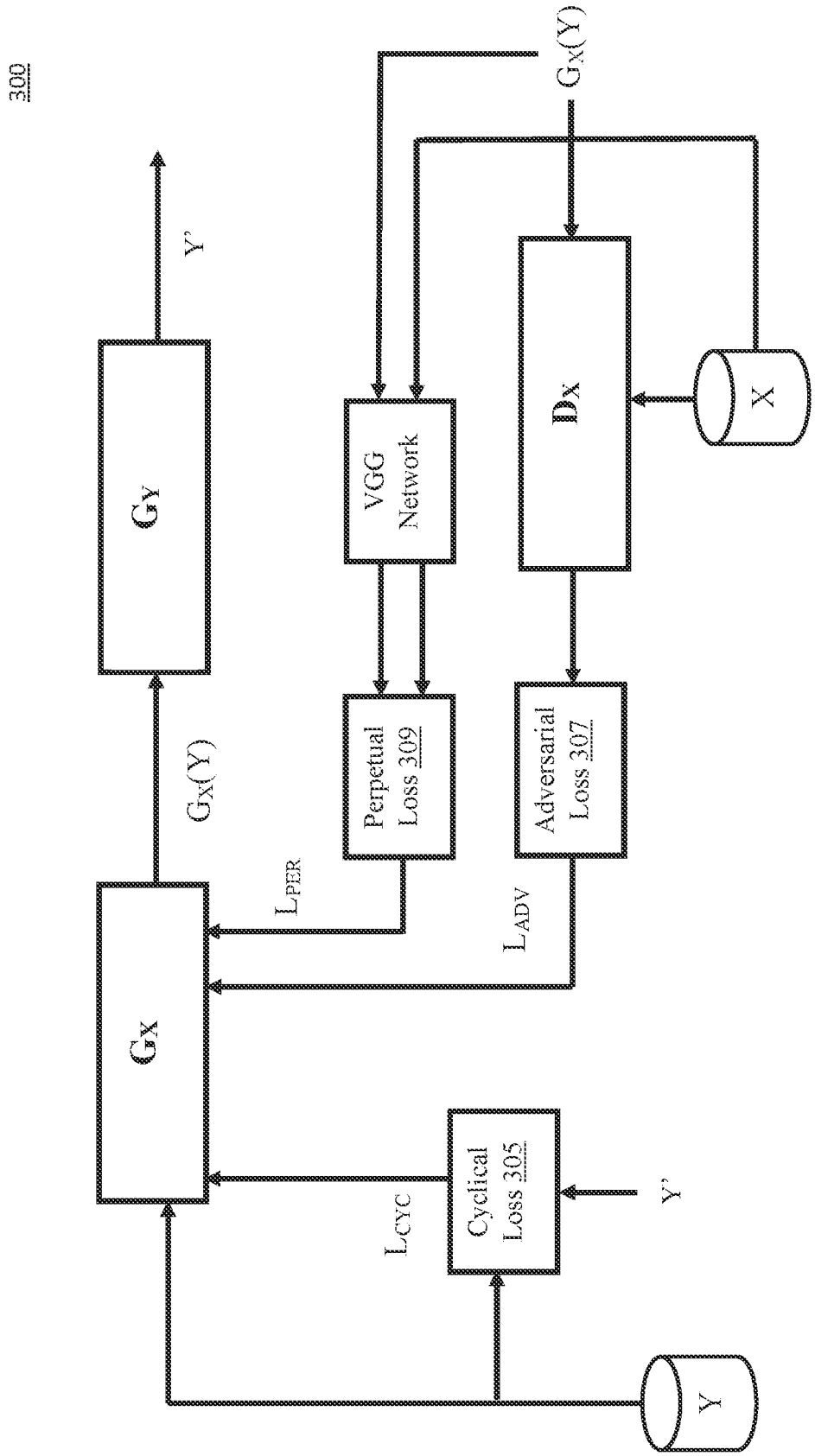
FIG. 3 is a block/flow diagram of an exemplary visual-to-thermal synthesis architecture, in accordance with embodiments of the present invention.

Regarding cross-spectral GAN, CS-GAN 116 has two networks. FIG. 2 illustrates the first network 200, which synthesizes visual spectrum object images from thermal images. Given a thermal patch (bounding-box), the generator 210 in the first network 200 synthesizes visual images that conserve the spatial information in the thermal patch. On the other hand, the discriminator 220 in the first network 200 learns to judge whether synthesized visual images are structurally sound, visually homogeneous and the images have representative object level features. The results show that CS-GAN 116 (FIG. 1) can achieve state-of-the-art generation quality, with lower Frechet Inception Distance (FID) scores. The second network 300, shown in FIG. 3, transforms visual images into the thermal domain. Such backward translation from visual to thermal domain preserves the cyclic property of the CycleGAN.

Regarding thermal to visual synthesis network 200, the network 200 includes a generator network 210 and a discriminator network 220. The generator network 210 synthesizes visual images from corresponding thermal patches. Discriminator network 220 is used to distinguish between real and generated visual images. This tug of war between the generator 210 and discriminator 220 leads to training of both the networks, so that the generator can produce good synthetic visual images.

Given a thermal image X, the generator $G_Y$ synthesizes a synthetic visual image $G_Y(X)$. The synthetic visual images are used for training the discriminator $D_Y$, which can distinguish between the original visual image Y and the synthesized visual image $G_Y(X)$. The discriminator network 220 is able to predict whether the image is real or fake, and its output allows computation of the adversarial loss for both the discriminator 220 and the generator 210. Generator network $G_X$, is used to reconstruct the original thermal image from the synthesized visual image $G_Y(X)$. The reconstructed thermal image is $X'=G_X(G_Y(X))$. The difference between the original thermal image and the synthesized thermal image (that is X, X') is used to calculate the cyclical loss 205, which is necessary to train the generator networks $G_Y$ and $G_X$.

To ensure that the synthesized visual images are of good quality, the exemplary methods leverage perceptual loss 207 that is normally used in image super resolution and style transfer tasks. Perceptual loss 207 can help with the synthesis of images of good quality to generate sharp images. The exemplary methods estimate perceptual loss 207 by using a pre-trained VGG-19 network 225. As shown in FIG. 2, the exemplary methods input the original visual image $G_Y(X)$ image to the VGG network 225. Features are extracted from slices of the network before each of the max pool layers. These output features are used to calculate the perceptual loss 207 using L1 norm.

Ensuring that the synthesized images are sharp, and of good quality is not sufficient. The exemplary methods also ensure that the synthesized images retain the important landmarks in an object. The exemplary methods introduce a new loss function to retain higher level object features such as facial features and facial landmarks in the synthesized visual images. Landmarks or features can be generic or task specific. For example, if the object is a face, the exemplary methods extract facial landmarks from the visual images and calculate the Euclidean distance between the features. By considering the landmarks in the source and target domain images, the exemplary methods compute the feature loss function 209.

Regarding the visual to thermal synthesis network 300, visual to thermal synthesis network has a generator $G_X$ and a discriminator $D_X$. Again, the exemplary methods use adversarial loss 307 to train the generator $G_X$ and discriminator $D_X$, using real and synthesized thermal images. For the cyclical loss 305, the exemplary methods calculate the L1 norm between the real Y and the reconstructed visual images $Y'=G_Y(G_X(Y))$. The perceptual loss function 309 is calculated from the real and synthesized thermal images $X(G_X(Y))$.

However, the exemplary methods note one major difference from the thermal to visual synthesis. Unlike the thermal to visual GAN design, the exemplary methods cannot use feature loss for training the generator $G_X$ because the visual domain landmarks estimator cannot extract features in thermal images, and there are no known reliable and accurate landmark estimators in the thermal domain.

Regarding the loss functions:

Adversarial loss ($L_{ADV}$), computed from the output of discriminators $D_Y$ and $D_X$, is applied to both generators, $G_Y$: X→Y and $G_X$: Y→X and fed back to discriminators $D_Y$ and $D_X$, respectively. Training samples from the thermal domain are x∈X and visual domain are y∈Y and the data distributions are denoted as x~$p_{data}(x)$ and y~$p_{data}(y)$ respectively.

$$L_{ADV}(G_Y, D_Y, X, Y) =$$
$$\min_{G_Y}\max_{D_Y} E_{y \sim p_{data}(y)}[\log D_Y(y)] + E_{x \sim p_{data}(x)}[\log(1 - D_Y(G_Y(x)))]$$

The adversarial training minimizes the cost for the generator and maximizes it for the discriminator which eventually leads to training of both the networks.

Cyclical loss ($L_{CYC}$) works to minimize errors between original and reconstructed images which are passed through both generators.

$$L_{CYC}(G_Y, G_X) =$$
$$E_{x \sim p_{data}(x)}[\|G_X(G_Y(x)) - x\|_1] + E_{y \sim pdata(y)}[\|G_Y(G_X(y)) - y\|_1]$$

The difference between the original image in the thermal domain $G_X(G_Y(x))$ should be as small as possible. It must fulfil the cyclic consistency of images which is represented as follows:

$$x'=G_X(G_Y(x)) \approx x.$$

Regarding perceptual loss, as cross spectral input images often have lower resolution, adding perceptual loss to the objective function helps to extract finer textures of objects in such images. This improvement allows the exemplary methods to have smaller input image sizes to enable real-time processing.

$$L_{PER}(G_Y, X, Y) = \sum_{i=1}^{N} \|V_{s_i}(G_Y(x)) - V_{s_i}(y)\|_1$$

Where N is the number of slices, $V_{s_i}$ is the ith slice of VGG19-network and $V_{s_i}(\cdot)$ is its corresponding feature. The loss is calculated between the real and generated images in both the domains and fed back to the generators.

Regarding the feature-preserving loss, the exemplary methods introduce a feature preserving loss (Algorithm 1 below) to optimize the generator $G_Y$. The exemplary methods estimate the Euclidean norm between the feature point coordinates of real and generated images in the visible spectral domain and minimize this error as training progresses. This enables the generator to produce textured synthetic images, which enables detection of various objects and associated landmarks with ease and higher accuracy.

Given a batch size m and k feature points, the exemplary methods define the feature preserving loss as:

$$L_{FEAT}(G_Y, X, Y) = \begin{cases} \frac{1}{m}\sum_{i=1}^{m}\sum_{j=1}^{k} \|fp_{yj} - fp_{G_Y}(x_j)\|_2, & \text{if } mRatio < t_{feat} \\ 0, & \text{otherwise} \end{cases}$$

Where $f_{pG_{Y(x)}}$ and $f_{p_y}$ are feature points of generated and real images respectively, $f_p \in \mathbb{R}^2$ is the coordinate of the feature point in an image, $t_{feat}$ is the threshold beyond which the FPL is added and mRatio is $$\frac{\text{\# of images with no features}}{\text{batch size}}.$$

Paired visual and corresponding visual object images are used for training purposes. The main goal is to ensure that synthetic images maintain landmark/correspondence with images in the visual domain, and to train the generator to learn the mapping function with fewer iterations. This allows the model to converge quickly during training. This also makes the CS-GAN feature-point-centric, and it conserves object specific features during inference.

Estimation of the feature preserving loss is described in Algorithm 1 below. In early iterations, the generator is not able to reproduce images with accurate features. Thus, the exemplary methods cannot detect features, and the exemplary methods do not consider feature-loss if the loss (miss rate) is too high, and this also prevents this loss from dominating other losses. Once the generator can produce images with noticeable features, the exemplary methods add feature loss to the overall objective function. As shown in Algorithm 1, the exemplary methods keep a state variable flag during training, which is set to false initially. At the end of every batch, the exemplary methods check whether features could be extracted from the generated images $G_Y(X)$.

Once the exemplary methods can detect features in more than $t_{feat}$ in batch of size m, the exemplary methods set flag to true and start including feature loss into the overall loss irrespective of the mRatio. The mRatio is compensated by adding a weighted error μ to the feature preserving loss. The value of μ is kept higher to compensate for missed cases since error for those isn't added to fl.

The overall objective function is given as:

$$L(G_Y, G_X, D_X, D_Y) = L_{ADV}(G_Y, D_Y, X, Y) + L_{ADV}(G_X, D_X, Y, X) + \quad (5)$$
$$\lambda_{cyc}L_{CYC}(G_Y, G_X) + \lambda_{per}L_{PER}(G_Y, Y, X) + \lambda_{feat}L_{FEAT}(G_Y, Y, X)$$

Where $\lambda_{cyc}$, $\lambda_{per}$, and $\lambda_{feat}$ are weighting hyper-parameters for cyclical, perceptual and feature preserving losses, respectively.

| Algorithm 1 Feature-preserving loss |
| --- |
| 1:  function FEATUREPRESERVINGLOSS($G_Y(X)$, Y, $t_{feat}$) |
| 2:     Initialize a feature loss, fl ← [ ] |
| 3:     Initialize miss ← 0 |
| 4:     Initialize result ← 0.0 |
| 5:     for ( $y$, $\hat{y}$ ) ∈ {Y, $G_Y(X)$} do |
| 6:        $fp_y$ ← extractFeaturePoints( $y$ ) |
| 7:        $fp_{\hat{y}}$ ← extractFeaturePoints( $\hat{y}$ ) |
| 8:        if $fp_{\hat{y}}$ then |
| 9:           fl $\overset{\rightarrow}{\leftarrow}$ $\|fp_y - fp_{\hat{y}}\|_2$ |
| 10:       else |
| 11:          miss ← miss + 1 |
| 12:       end if |
| 13:    end for |
| 14:    if ¬flag ^ (miss / Y.length ≤ $t_{feat}$) then |
| 15:       flag ← true |
| 16:    end if |
| 17:    if flag then |
| 18:       result ← mean(fl) + μ * miss |
| 19:    end if |
| 20:    return result |
| 21: end function( ) |

Regarding the dual bottleneck residual block, vanishing gradients are a common issue in deeper networks. Gradients start getting smaller and smaller as they are backpropagated to earlier layers due to a chain multiplication of partial derivatives. Skip connections using residual blocks provide an alternate path for gradients by skipping layers, which helps in model convergence. The intuition behind skipping layers is that it is easier to optimize residual mapping than to optimize the original, un-referenced mapping. Skip connections enable information that was captured in initial layers (where the features correspond to lower semantic information) to be utilized in deeper layers. Without skip connections, low-level information would become abstract as such information travels deeper in the network. Utilizing bottleneck blocks instead of basic residual blocks is beneficial, as it reduces the number of channels for convolutions. This significantly improves the computation time for a forward pass. It also reduces the search space for the optimizer, which improves training.

Figure 4:
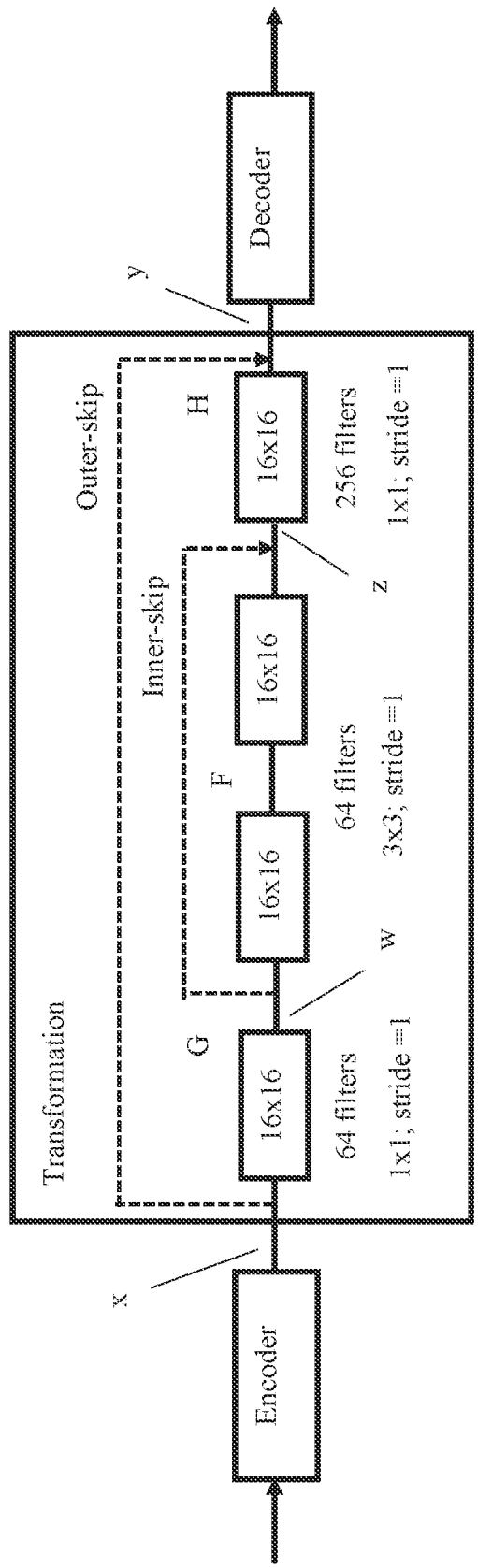
FIG. 4 is a block/flow diagram of an exemplary dual bottleneck residual block, in accordance with embodiments of the present invention.

The exemplary methods introduce the use of a dual bottleneck residual block (Dual BRB 400), shown in FIG. 4, which includes four convolutional blocks using G(., (1×1), F(., (3×3, 3×3)), H(., (1×1)). The function G(·) squeezes the number of channels by a factor of 4. This decrease reduces the number of channels for function F(·). The exemplary methods then have function H(·) which expands the number of channels by a factor of 4 similar to the input channels. The exemplary methods have two skip connections in the Dual-BRB 400. The inner skip connection works as an identity for function F(·), while the outer skip connection is an identity for the complete Dual-BRB. The outer skip connection serves to provide identity mapping, similar to the one in the basic residual block.

Blocks in Dual-BRB 400 are represented as follows:

$$w=G(x); z=F(w)+w; y=H(z)+x;$$

The output from Dual-BRB 400 is:

$$y=H(F(G(x))+G(x))=x$$

3×3 convolution, which is added on top of the basic bottleneck adds robustness during initial epochs, but doesn't converge properly in later epochs while training.

Inner skip connection across $F(\cdot)$ helps in learning the residual across it, while helping in model robustness and convergence. The intuition for inner skip connection is to create an alternative path for backpropagation of gradients during the later epochs of training which helps with convergence and provides stability during training.

The final equation of y includes a combination of $F(G(x))$ and $G(x)$. Having this alternative path for the backpropagation of gradients helps in eliminating the function $F(\cdot)$ if needed for a particular block instead of eliminating the complete block.

Also, y includes a combination of $H(\cdot)$ and x, having another alternative path for the backpropagation of gradients across the complete block. This modification in the transformer block helps achieve the real-time inferencing, quality, and accuracy of generated images.

Figure 5:
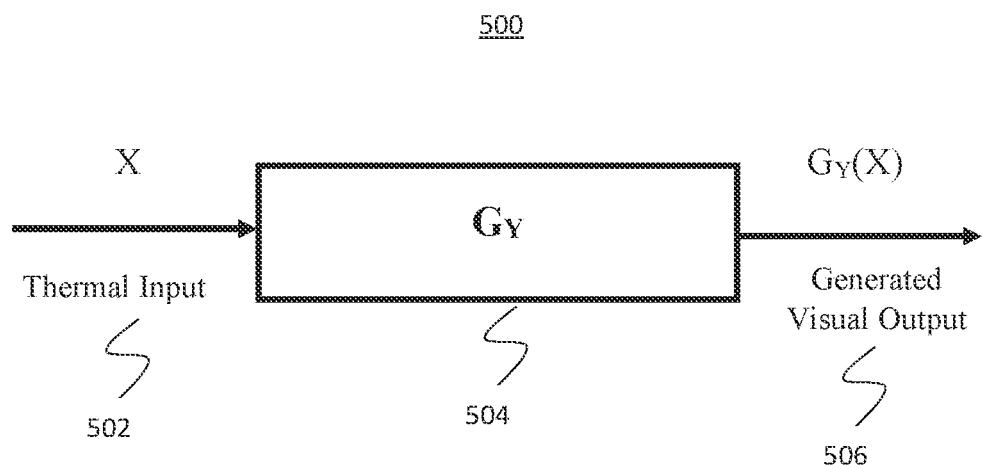
FIG. 5 is a block/flow diagram of exemplary cross-spectral generative adversarial network (CS-GAN) inferencing, in accordance with embodiments of the present invention.

Regarding inferencing, inferencing block 500 is highlighted in FIG. 5. The thermal object image tiles 502 which are obtained from adaptive spatial search are fed to generator $G_Y$ (504), which in turn transforms them to the visible spectral domain. These transformed visible spectral images 506 retain structural information of thermal images so that feature points can be extracted.

Figure 6:
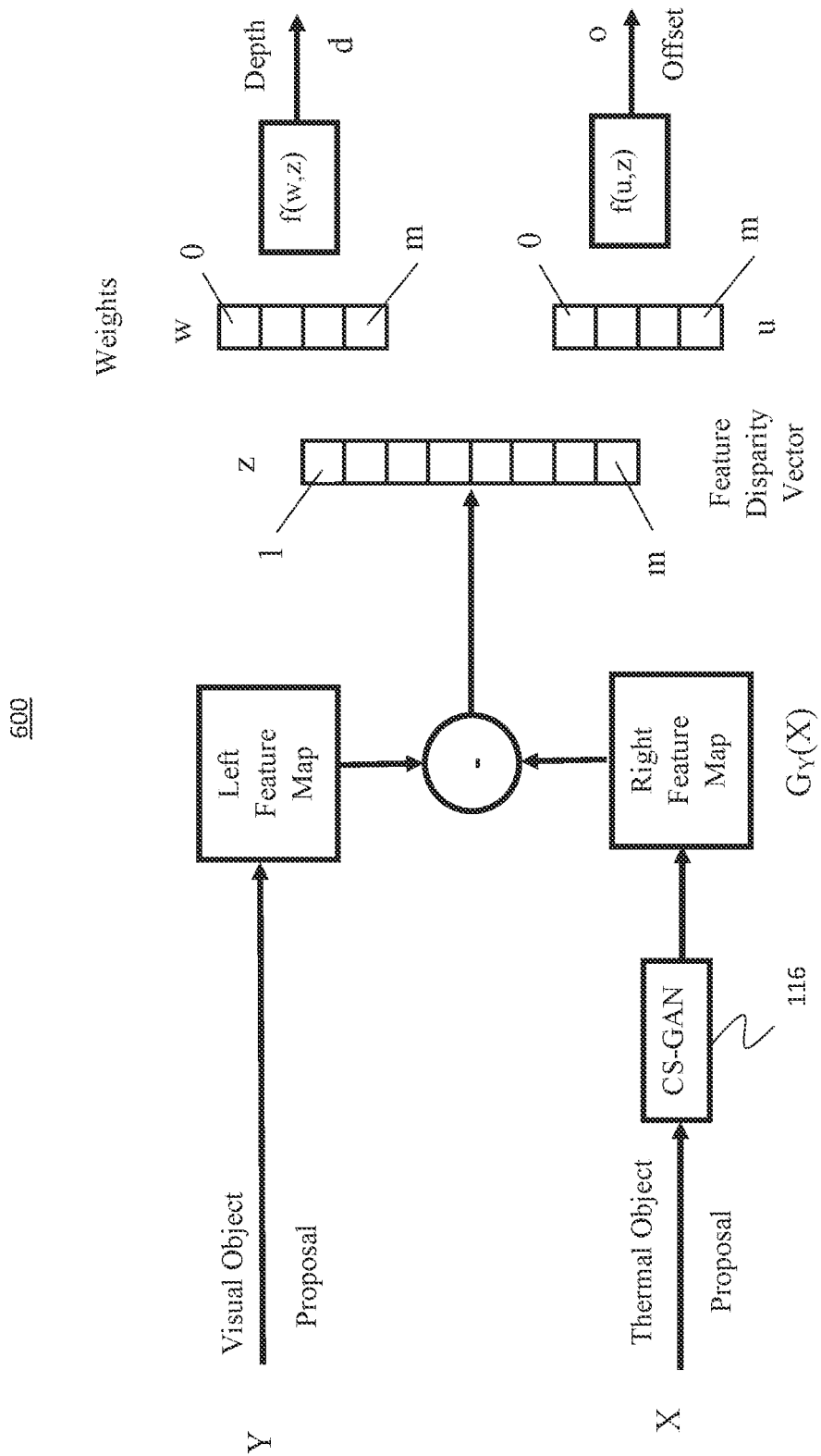
FIG. 6 is a block/flow diagram of an exemplary depth and offset estimator, in accordance with embodiments of the present invention.

Regarding the depth and offset estimator 600, as shown in FIG. 6, to estimate distance and offset of objects in a scene relative to a sensor, the exemplary methods introduce an object specific depth perception network.

For each incoming frame Y from the visual camera, objects of interest are identified using 2D object detectors. Performance of 2D object detectors is suitable for real-time inferencing even in embedded systems with high degree of accuracy. Since both visual and thermal sensors are separated by baseline distance without being coplanar, images are not mutually aligned with respect to each other. Once the bounding box of objects is identified in visual domain, adaptive spatial search 114 (FIG. 1) is performed to identify object proposals in the thermal domain with proposal areas being a function of sensor displacement, sensor field of views, zoom levels, their resolutions, and relative orientation.

Let visual image Y include $\{y_i\}_{i=1}^n$ where n is the number of objects.

Visual bounding boxes are $\{B_{y_i}\}_{i=1}^n$ where $B_{y_i}=(B_{y_ix}, B_{y_iy}, B_{y_iw}, B_{y_ih})$ specifies the pixel co-ordinates (x, y) with a width and a height of the bounding box.

Let the thermal image be X and the associated thermal bounding box proposals are:

$B_{x_i}=\Phi(B_{y_i})$ where $\Phi$ is a transformation function, to estimate the bounding box in the thermal image. $B_x$ is estimated by using multiple parameters. The bounding box area of an object is directly proportional to a focal length of a camera when the distance between the camera and the object is unchanged, that is, increasing focal length brings objects closer by narrowing the extent of field of view. Adaptive search also depends on baseline (distance separating the cameras) b, which determines the offset, angle of view, and image resolution. In the exemplary methods, the image resolutions of both cameras are the same and the field of view intersects more than 95%, where the function $\Phi$ is heuristically calculated using the ratio of focal lengths of cameras and offset.

Let the pairs ($R_Y$, $R_X$) and ($f_Y$, $f_X$) represent resolution and focal length of visual and thermal imaging sensor.

Given $\Phi \propto (f,R)$, the heuristic bounding box is estimated as:

$B_x = f_x B_y / f_y \pm \hat{b}$, where $\hat{b}$ is the horizontal offset.

Using thermal object proposals $B_x$, visual object proposals $B_y$ are expanded, so that each visual ($y_i$) and corresponding thermal ($x_i$) cropped proposal has the same size.

Next, landmark detection is performed on $y_i$ and feature vector $y_i$ is extracted.

Since landmark detection cannot be performed directly on x, it is covered to $G_Y(x_i)$ using the previously described CS-GAN 116. Landmark detection is performed on $G_Y(x_i)$ and feature vector $\hat{y}_i$ is extracted.

Let z be an object feature disparity vector. z includes a Euclidean distance between k-feature points and an angle between k-feature points, e.g. $z=(\|y-\hat{y}\|_2, \operatorname{atan}(y,\hat{y}))$.

Where $z \in \mathbb{R}^m$ and m=2k.

The exemplary embodiments regress distance (d) from sensors and offset (o) of thermal images from the visual camera by training a multiple variable linear regression using 2k explanatory variables. The exemplary methods train the regressor by minimizing the residual sum of squares. Let the coefficients of the distance-estimator model be $w \in \mathbb{R}^{m+1}$, offset-estimator coefficients are $u \in \mathbb{R}^{m+1}$, and the distance is then estimated as:

$$d = w_0 + \sum_{j=1}^{m} w_j z_j + \hat{\varepsilon}_d = w^T z + \hat{\varepsilon}_d$$

$$o = u^T z + \hat{\varepsilon}_o$$

Where $\hat{\varepsilon}_d$ and $\hat{\varepsilon}_o$ are the distance and offset residuals.

Figure 7:
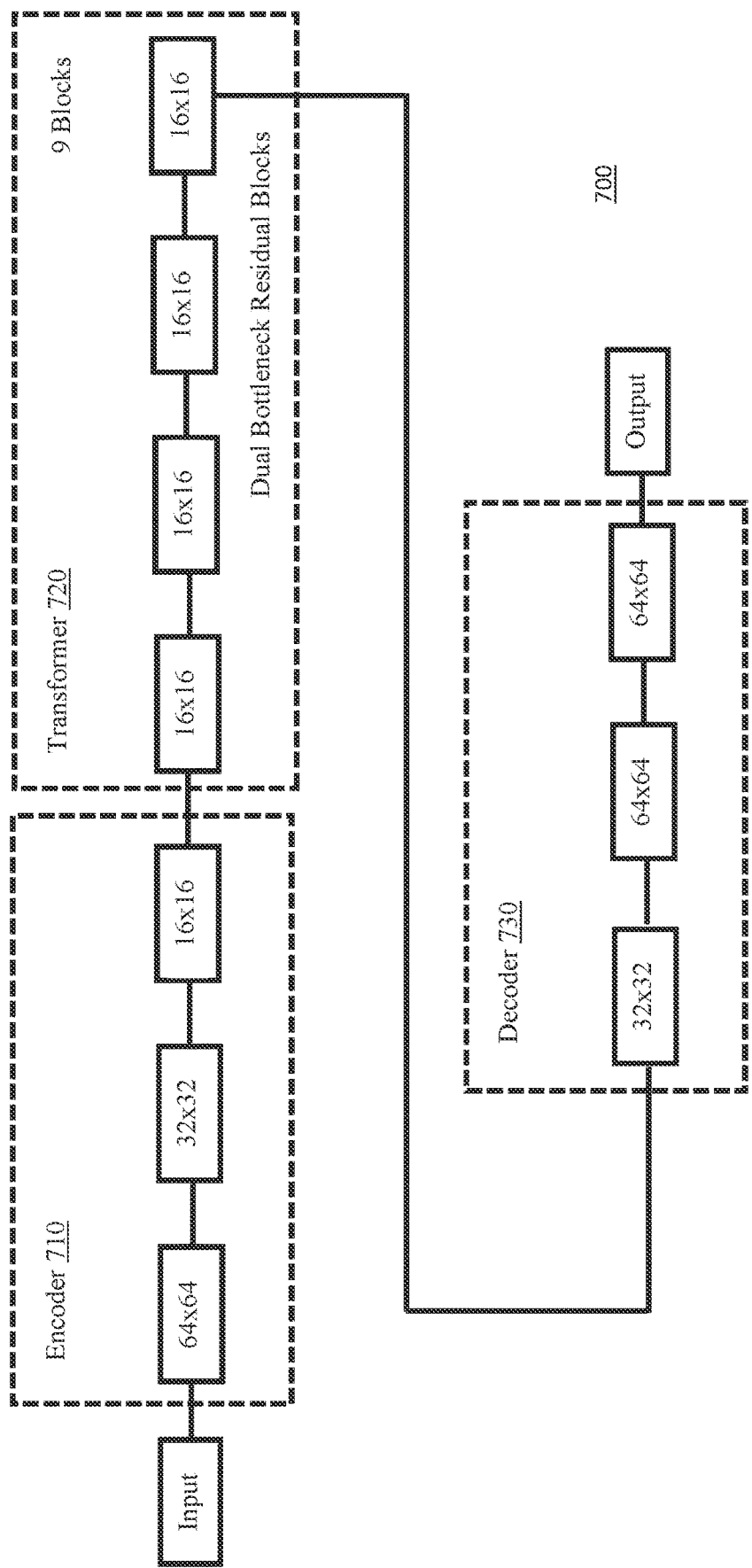
FIG. 7 is a block/flow diagram of an exemplary generator network architecture, in accordance with embodiments of the present invention.

In an exemplary network architecture 700, as shown in FIG. 7, generator network includes an encoder 710, a transformer 720, and a decoder block 730. The encoder network 710 includes a 7×7 convolution layer, followed by down-sampling using two 3×3 convolution layers (with stride-2). The transformer network 720 includes nine dual bottleneck residual blocks (Dual-BRB). Each Dual-BRB includes 1×1 convolution, a residual block, followed by 1×1 convolution again to squeeze and expand the number of channels to reduce computation. The exemplary methods use a full pre-activation residual block of 3×3 convolution.

Skip connection is added from the input of the Dual-BRB to the output of the block in addition to a skip connection between residual block. The Dual-BRBs reduce inference time by a factor of 3.5 compared to basic residual block implementations, without degrading the image quality. The decoder network 730 includes two up-sampling layers of 3×3 transpose convolution (T.CONV) and a 7×7 convolution layer with tanh activation. All the convolution layers are followed by instance normalization (IN). Discriminator networks $D_Y$ and $D_X$ classify patches in original and generated images as real or fake.

Training of the generator architecture can be performed by the following algorithm:

---

Algorithm 2 CS-GAN Training.

1: function TRAINCSGAN($G_X$, $G_Y$, $D_X$, $D_Y$, X, Y)
2:     Draw m samples $\{(x_i, y_i)\}_{i=1}^{m}$, from X, Y
3:     Compute adversarial loss, $l_{adv}$ $$l_{adv} \leftarrow \frac{1}{2m}\sum_{i=1}^{m}\left[D_X(G_X(y_i)))^2 + (D_Y(G_Y(x_i)))^2\right]$$

4:     Compute cyclical loss $l_{cyc}$, perceptual loss $l_{perp}$, feature preserving loss $l_{feat}$ (Refer:Algorithm 1)
5:     Generator loss $$l_G \leftarrow \lambda_{adv} l_{adv} + \lambda_{cyc} l_{cyc} + \lambda_{per} l_{per} + \lambda_{feat} l_{feat}$$

6:     Discriminator loss $$l_{D_X} \leftarrow \frac{1}{m}\sum_{i=1}^{m}\left[(D_X(x_i))^2 + (1 - D_X(G_X(y_i)))^2\right]$$

$$l_{D_Y} \leftarrow \frac{1}{m}\sum_{i=1}^{m}\left[(D_Y(y_i))^2 + (1 - D_Y(G_Y(x_i)))^2\right]$$

7:     Update discriminator and generator weights
8:     Iterate until convergence
9:     end function( )

---

In conclusion, the exemplary methods present a cross-spectral object association and depth estimation technique for real-time cross-spectral applications. The cross-spectral generative adversarial network (CS-GAN) synthesizes visual images that have the key, representative object level features required to uniquely associate objects across visual and thermal spectrum. Features of CS-GAN include a feature preserving loss function that results in high-quality pairing of corresponding cross-spectral objects, and dual bottleneck residual layers with skip connections (a new, network enhancement) to not only accelerate real-time inference, but also speed up convergence during model training. By using the feature-level correspondence from CS-GAN, a novel real-time system is created to accurately fuse information in thermal and full HD visual data streams.

Figure 8:
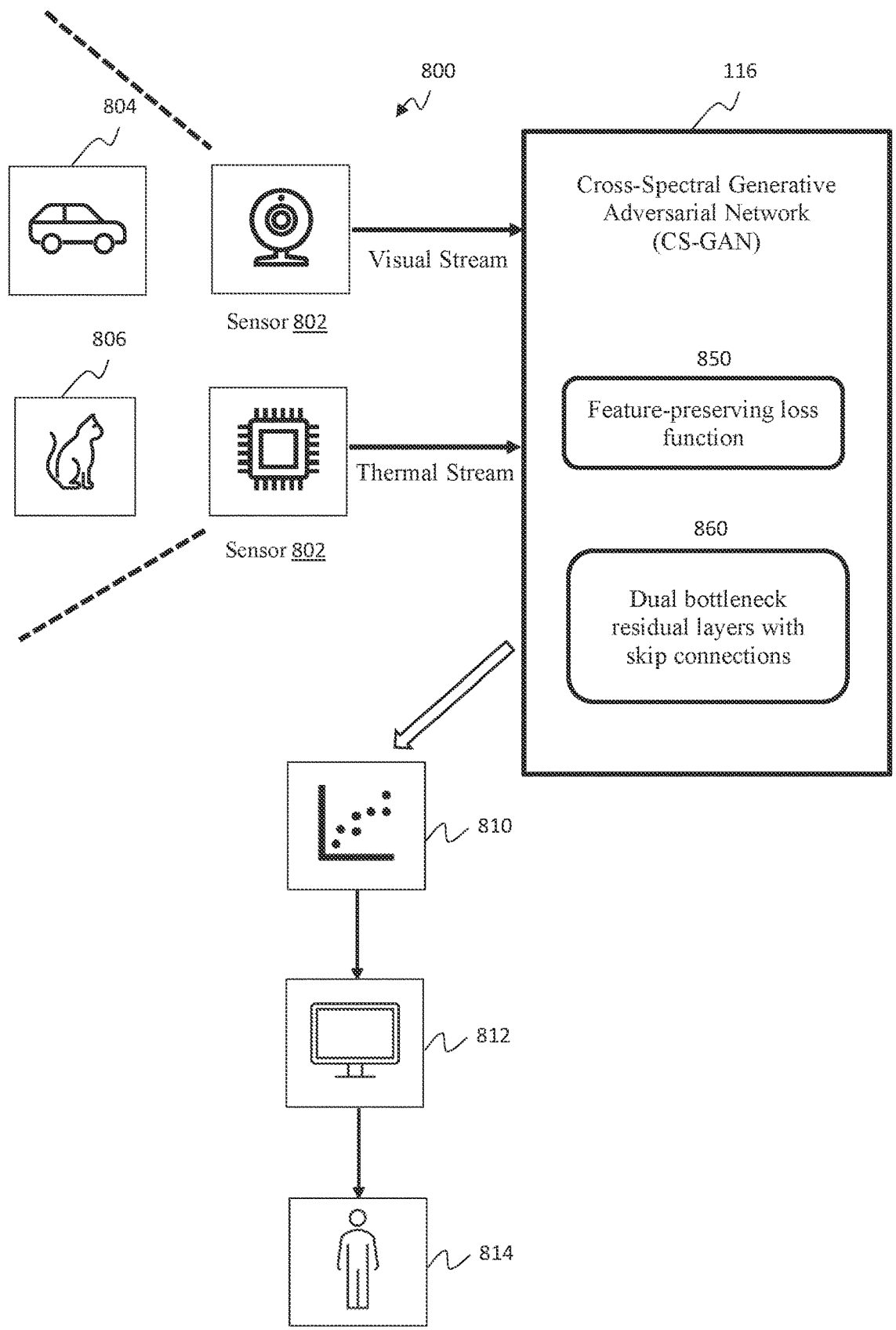
FIG. 8 is an exemplary practical application for real-time cross-spectral object association and depth estimation, in accordance with embodiments of the present invention.

FIG. 8 is a block/flow diagram 800 of a practical application for real-time cross-spectral object association and depth estimation, in accordance with embodiments of the present invention.

In one practical example, one or more sensors 802 detect objects, such as, objects 804, 806 and provide visual streams and thermal streams to the CS-GAN 116, which includes a feature preserving loss function 850 and dual bottleneck residual layers with skip connection 860. The results 810 (e.g., target objects) can be provided or displayed on a user interface 812 handled by a user 814.

Figure 9:
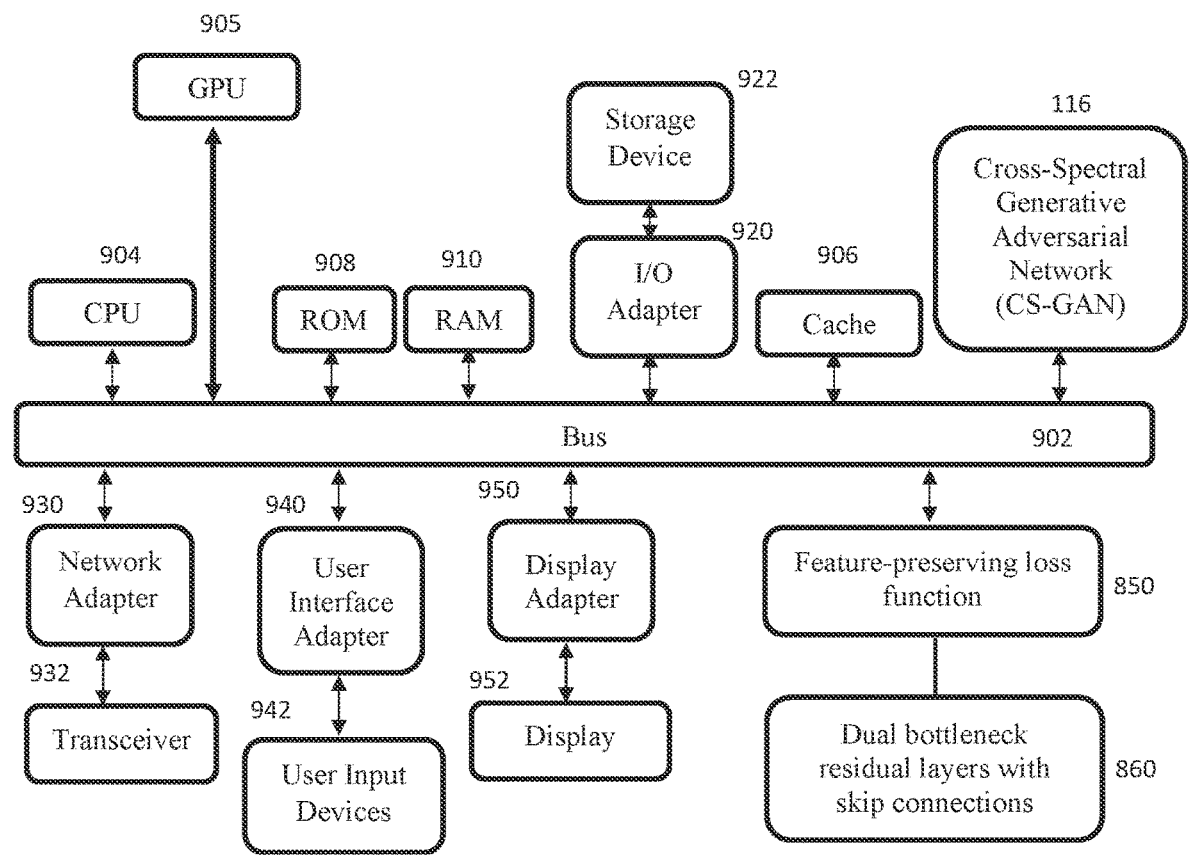
FIG. 9 is an exemplary processing system for real-time cross-spectral object association and depth estimation, in accordance with embodiments of the present invention.

FIG. 9 is an exemplary processing system for real-time cross-spectral object association and depth estimation, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the CS-GAN 116 can be employed by using a feature-preserving loss function 850 and dual bottleneck residual layers with skip connections 860.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
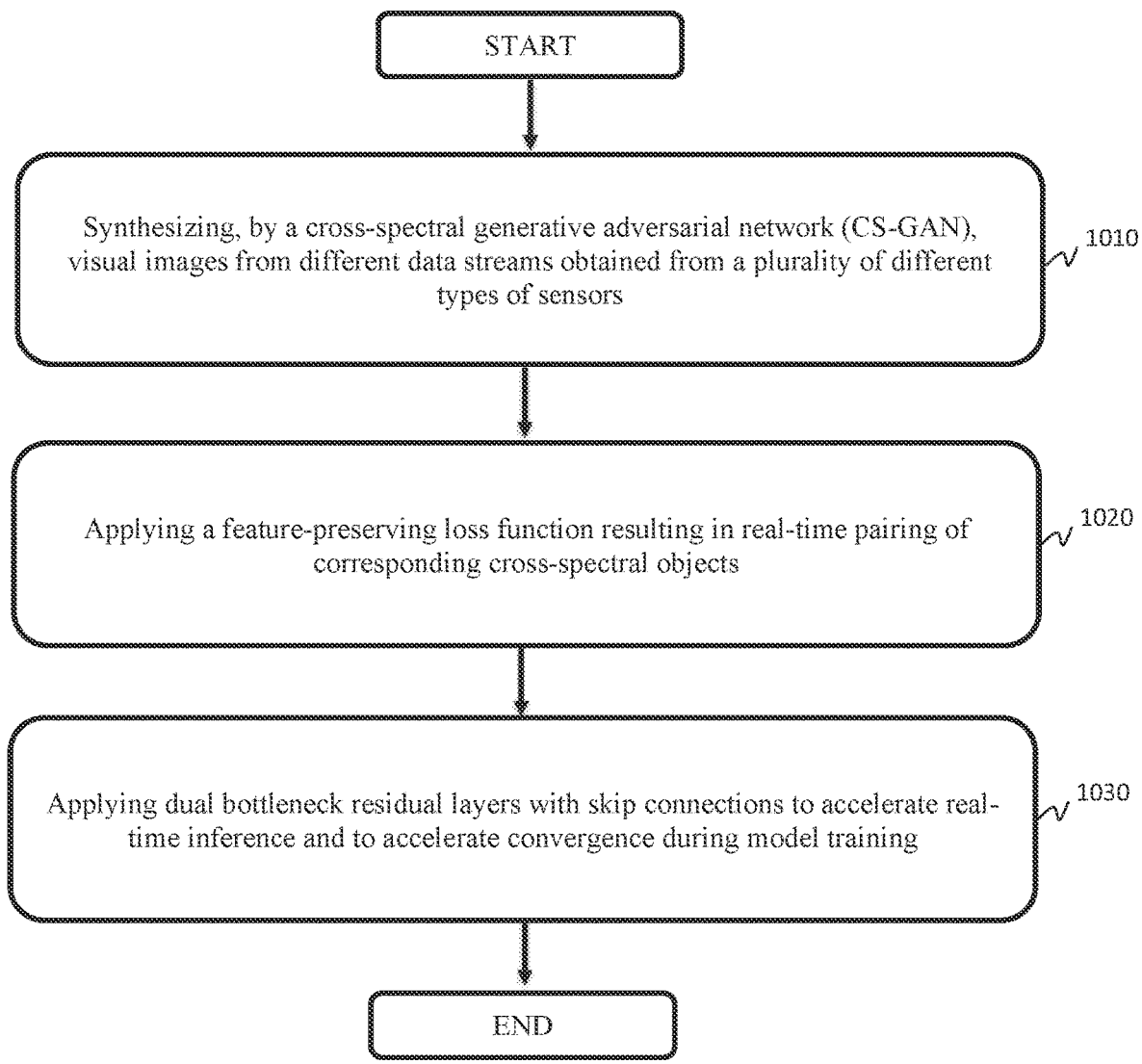
FIG. 10 is a block/flow diagram of an exemplary method for real-time cross-spectral object association and depth estimation, in accordance with embodiments of the present invention.

FIG. 10 is a block/flow diagram of an exemplary method for real-time cross-spectral object association and depth estimation, in accordance with embodiments of the present invention.

At block 1010, synthesizing, by a cross-spectral generative adversarial network (CS-GAN), visual images from different data streams obtained from a plurality of different types of sensors.

At block 1020, applying a feature-preserving loss function resulting in real-time pairing of corresponding cross-spectral objects.

At block 1030, applying dual bottleneck residual layers with skip connections to accelerate real-time inference and to accelerate convergence during model training.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for real-time cross-spectral object association and depth estimation, the method comprising:
   synthesizing, by a cross-spectral generative adversarial network (CS-GAN), visual images from different data streams obtained from a plurality of different types of sensors;
   applying a feature-preserving loss function resulting in real-time pairing of corresponding cross-spectral objects; and
   applying dual bottleneck residual layers with skip connections to accelerate real-time inference and to accelerate convergence during model training.

2. The method of claim 1, wherein object detection is performed in at least one data stream of the different data streams to detect first objects.

3. The method of claim 2, wherein an adaptive spatial search is performed in at least one data stream of the different data streams to form several candidate bounding box proposals as second objects.

4. The method of claim 3, wherein the first objects are fed to a first feature extractor and the second objects are fed to the CS-GAN for data transformation, and then to a second feature extractor.

5. The method of claim 1, wherein the CS-GAN includes bottleneck cascaded residual layers along with custom perpetual loss and feature loss functions.

6. The method of claim 1, wherein the CS-GAN includes a first network and a second network, the first network being a thermal-to-visual synthesis network and the second network being a visual-to-thermal synthesis network.

7. The method of claim 6, wherein the first network includes a generator and a discriminator, the generator synthesizing visual images from corresponding thermal patches, and the discriminator distinguishing between real and generated visual images.

8. The method of claim 7, wherein a cyclical loss, an adversarial loss, a perpetual loss, and a feature loss are employed to optimize the generator, and wherein the feature loss estimates a Euclidean norm between feature point coordinates of the real and generated visual images and minimizes an error as training progresses.

9. The method of claim 1, wherein a depth and offset estimator is provided to estimate distance and offset of objects in a scene relative to a sensor of the plurality of sensors by an object specific depth perception network.

10. A non-transitory computer-readable storage medium comprising a computer-readable program for real-time cross-spectral object association and depth estimation, wherein the computer-readable program when executed on a computer causes the computer to perform the steps of:
    synthesizing, by a cross-spectral generative adversarial network (CS-GAN), visual images from different data streams obtained from a plurality of different types of sensors;
    applying a feature-preserving loss function resulting in real-time pairing of corresponding cross-spectral objects; and
    applying dual bottleneck residual layers with skip connections to accelerate real-time inference and to accelerate convergence during model training.

11. The non-transitory computer-readable storage medium of claim 10, wherein object detection is performed in at least one data stream of the different data streams to detect first objects.

12. The non-transitory computer-readable storage medium of claim 11, wherein an adaptive spatial search is performed in at least one data stream of the different data streams to form several candidate bounding box proposals as second objects.

13. The non-transitory computer-readable storage medium of claim 12, wherein the first objects are fed to a first feature extractor and the second objects are fed to the CS-GAN for data transformation, and then to a second feature extractor.

14. The non-transitory computer-readable storage medium of claim 10, wherein the CS-GAN includes bottleneck cascaded residual layers along with custom perpetual loss and feature loss functions.

15. The non-transitory computer-readable storage medium of claim 10, wherein the CS-GAN includes a first network and a second network, the first network being a thermal-to-visual synthesis network and the second network being a visual-to-thermal synthesis network.

16. The non-transitory computer-readable storage medium of claim 15, wherein the first network includes a generator and a discriminator, the generator synthesizing visual images from corresponding thermal patches, and the discriminator distinguishing between real and generated visual images.

17. The non-transitory computer-readable storage medium of claim 16, wherein a cyclical loss, an adversarial loss, a perpetual loss, and a feature loss are employed to optimize the generator and wherein the feature loss estimates a Euclidean norm between feature point coordinates of the real and generated visual images and minimizes an error as training progresses.

18. The non-transitory computer-readable storage medium of claim 10, wherein a depth and offset estimator is provided to estimate distance and offset of objects in a scene relative to a sensor of the plurality of sensors by an object specific depth perception network.

19. A system for real-time cross-spectral object association and depth estimation, the system comprising:
    a memory; and
    one or more processors in communication with the memory configured to:
      synthesize, by a cross-spectral generative adversarial network (CS-GAN), visual images from different data streams obtained from a plurality of different types of sensors;
      apply a feature-preserving loss function resulting in real-time pairing of corresponding cross-spectral objects; and
      apply dual bottleneck residual layers with skip connections to accelerate real-time inference and to accelerate convergence during model training.

20. The system of claim 19, wherein the CS-GAN includes a first network and a second network, the first network being a thermal-to-visual synthesis network and the second network being a visual-to-thermal synthesis network, the first network including a generator and a discriminator, the generator synthesizing visual images from corresponding thermal patches, and the discriminator distinguishing between real and generated visual images, and wherein a cyclical loss, an adversarial loss, a perpetual loss, and a feature loss are employed to optimize the generator.

* * * * *